(12) United States Patent
Tang

(10) Patent No.: US 11,401,029 B2
(45) Date of Patent: Aug. 2, 2022

(54) AIRCRAFT IMPELLER AND AIRCRAFT

(71) Applicant: Lianglun Tang, Sichuan (CN)

(72) Inventor: Lianglun Tang, Sichuan (CN)

( * ) Notice: Subject to any disclaimer, the term of this patent is extended or adjusted under 35 U.S.C. 154(b) by 155 days.

(21) Appl. No.: 16/764,659

(22) PCT Filed: Sep. 19, 2018

(86) PCT No.: PCT/CN2018/106537
§ 371 (c)(1),
(2) Date: May 15, 2020

(87) PCT Pub. No.: WO2019/095841
PCT Pub. Date: May 23, 2019

(65) Prior Publication Data
US 2020/0283123 A1  Sep. 10, 2020

(30) Foreign Application Priority Data
Nov. 16, 2017  (CN) .......................... 201711135805.7

(51) Int. Cl.
*B64C 11/00*  (2006.01)
(52) U.S. Cl.
CPC .......... *B64C 11/007* (2013.01); *B64C 11/001* (2013.01)
(58) Field of Classification Search
CPC ....... B64C 11/00; B64C 11/007; B64C 27/20; B64C 39/001; F04D 29/26; F04D 29/188;
(Continued)

(56) References Cited

U.S. PATENT DOCUMENTS 1,910,443 A * 5/1933 Mobley ................... B64C 11/00
                                                    416/189
2,103,242 A * 12/1937 Bradford, Jr. ........... B64C 11/00
                                                    416/185
(Continued)

FOREIGN PATENT DOCUMENTS

CN          2382652 Y      6/2000
CN        101463831 A      6/2009
(Continued)

OTHER PUBLICATIONS

English Abstract of CN2382652 (Machine Translation) retrieved on May 10, 2020.
(Continued)

*Primary Examiner* — Richard A Edgar
(74) *Attorney, Agent, or Firm* — Syncoda LLC; Feng Ma

(57) ABSTRACT

An aircraft impeller (001) and an aircraft, relating to the field of aircraft drive components, the aircraft impeller (001) including a frame body (100) and a rotating wheel part (200); the frame body (100) includes a mounting groove (130), the rotating wheel part (200) being fixedly arranged in the mounting groove (130); the mounting groove (130) has an axial centre line (105); the mounting groove (130) also has an open face and a bottom face (131) arranged opposite to one another; the rotating wheel part (200) includes at least one vane (210) distributed around the axial centre line (105), the vane (210) including a windward face (211); at the connecting point of the windward face (211) and the open face, the angle of the tangent plane of the windward face (211) and the open face is an acute angle.

16 Claims, 5 Drawing Sheets

(58) Field of Classification Search
CPC . F04D 5/00; F04D 5/001; F04D 5/002; F04D 23/008
USPC .......................................................... 415/92
See application file for complete search history.

(56) References Cited

U.S. PATENT DOCUMENTS

| | | | | |
|---|---|---|---|---|
| 2,270,686 | A * | 1/1942 | Moore ................. | B64C 11/007 416/188 |
| 2,378,125 | A * | 6/1945 | Bowman ............... | B64C 11/007 416/32 |
| 3,124,200 | A * | 3/1964 | Wilson .................. | B64C 11/007 416/93 R |
| 11,021,232 | B2 * | 6/2021 | Deng ...................... | B63H 23/34 |
| 2003/0118446 | A1 | 6/2003 | Han et al. | |
| 2006/0045748 | A1 | 3/2006 | Cahoon et al. | |
| 2006/0076456 | A1 | 4/2006 | Layton | |
| 2012/0251322 | A1 | 10/2012 | McGee | |
| 2014/0141107 | A1 | 5/2014 | Rajendran et al. | |

FOREIGN PATENT DOCUMENTS

| | | |
|---|---|---|
| CN | 103318393 A | 9/2013 |
| CN | 205396548 U | 7/2016 |
| CN | 107215459 A | 9/2017 |
| CN | 107284652 A | 10/2017 |
| CN | 107856843 A | 3/2018 |
| CN | 207417127 U | 5/2018 |
| DE | 1531457 A1 | 4/1970 |
| JP | S4921899 A | 2/1974 |
| JP | 2006321252 A | 11/2006 |
| JP | 3150942 U | 6/2009 |
| JP | 2014141107 A | 8/2014 |
| WO | 0133084 A1 | 5/2001 |

OTHER PUBLICATIONS

English Abstract of CN101463831 (Machine Translation) retrieved on May 10, 2020.
English Abstract of CN103318393 (Machine Translation) retrieved on May 10, 2020.
English Abstract of CN107215459 (Machine Translation) retrieved on May 10, 2020.
English Abstract of CN107856843 (Machine Translation) retrieved on May 10, 2020.
English Abstract of CN205396548 (Machine Translation) retrieved on May 10, 2020.
English Abstract of CN207417127 (Machine Translation) retrieved on May 10, 2020.
International Search Report (including English Translation) and Written Opinion with regard to PCT/CN2018/106537 dated Dec. 24, 2018.
Notification of Grant with regard to the CN Patent Application No. CN201711135805.7 dated Jan. 6, 2020.
English Translation of Notification of Grant with regard to the CN Patent Application No. CN201711135805.7.
Office Action with regard to the CN Patent Application No. CN201711135805.7 dated Apr. 12, 2019.
English Translation of Office Action with regard to the CN Patent Application No. CN201711135805.7.
Office Action with regard to the counterpart JP Patent Application No. 2020-543667 dated Jun. 28, 2021.
Office Action with regard to the counterpart IN Patent Application No. 202027024539 dated Apr. 12, 2021.
Office Action with regard to the counterpart EP Patent Application No. 18879459.8 dated Aug. 8, 2021.
English Abstract for CN107284652 retrieved on Espacenet on Feb. 24, 2022.
English Translation (Description and Claims) for DE1531457 retrieved on Espacenet on Feb. 24, 2022.
English Abstract for JP3150942 retrieved on Espacenet on Feb. 24, 2022.
English Abstract for CN205396548 retrieved on Espacenet on Feb. 24, 2022.
English Abstract for JP2006321252 retrieved on Espacenet on Feb. 24, 2022.
English Abstract for CN107215459 retrieved on Espacenet on Feb. 24, 2022.
English Abstract for CN2382652 retrieved on Espacenet on Feb. 24, 2022.
English Description for JPS4921899 retrieved on Espacenet on Feb. 26, 2022.
English Abstract for JP2003514177 retrieved on Espacenet on Feb. 26, 2022.
English Abstract for JP2014141107 retrieved on Espacenet on Feb. 26, 2022.

* cited by examiner

AIRCRAFT IMPELLER AND AIRCRAFT

CROSS-REFERENCE TO RELATED APPLICATIONS

The present application claims priority to Chinese Patent Application No. 201711135805.7, filed with the Chinese Patent Office on Nov. 16, 2017, entitled "Aircraft Impeller and Aircraft", which is incorporated herein by reference in its entirety.

TECHNICAL FIELD

The present application relates to the field of lifting force components for aircrafts, and in particular to an aircraft impeller and an aircraft.

BACKGROUND ART

At present, wing-type airplanes, including propeller-type airplanes, have a lift force derived from a difference in air flow velocity on the surface of the wing during flight, and the propellers of the airplanes must keep moving to maintain the lift force, which is very energy-intensive.

SUMMARY

The present application provides an aircraft impeller and an aircraft. The object of the present application includes solving the above problems existing in the aircraft impellers and the aircrafts in the prior art.

The present application is implemented by:
an aircraft impeller, comprising a frame body and a rotary wheel part; wherein the frame body comprises a mounting groove, in which the rotary wheel part is fixedly arranged;
the mounting groove has an axial centre line; and the mounting groove further has an open surface and a bottom surface, which are arranged opposite to each other;
the rotary wheel part comprises at least one blade distributed around the axial centre line, the blade comprising a windward surface; and an angle, at a position where the windward surface is connected to the open surface, formed between the open surface and a plane tangential to the windward surface, is an acute angle.

Optionally, a mounting through hole is provided in the middle of the mounting groove, the mounting through hole has a central axis substantially coincident with the axial centre line, and the mounting through hole has a sidewall extending from the open surface to the bottom surface.

Optionally, the blade has a cycloidal curvature that curves in a rotation direction away from the axial centre line.

Optionally, the mounting groove is a cylindrical groove, and an end of the blade remote from the axial centre line is fixedly connected to an inner wall of the mounting groove.

Optionally, the mounting through hole is a cylindrical through hole.

Optionally, twelve blades are provided, and the twelve blades are mounted at an equal interval around the axial centre line in a circumferential direction.

Optionally, an end of the blade remote from the bottom surface is located on the open surface.

Optionally, an end of the blade close to the bottom surface is fixedly connected to the bottom surface.

Optionally, a protrusion extending away from the open surface is arranged on a side of the frame body remote from the open surface, the protrusion is a cylindrical bump, and the protrusion has an axial center substantially coincident with the axial centre line.

Optionally, a distance from an end of the protrusion remote from the second surface to the second surface is smaller than a distance from the first surface to the second surface.

Optionally, the angle, formed between the open surface and the plane tangential to the windward surface at a position where the windward surface is connected to the open surface, gradually decreases in a direction extending from the axial centre line to an edge of the mounting groove.

Optionally, the blade further has a leeward surface opposite to the windward surface, and the leeward surface and the windward surface have the same radians at their respective corresponding points.

Optionally, the frame body is in the shape of a disc.

Optionally, the aircraft impeller further comprises a protective cover capable of covering the first surface, and the protective cover is detachably arranged on an outer sidewall formed by connecting an outer edge of the first surface and an outer edge of the second surface to each other.

Optionally, an internal thread is provided inside the mounting through hole, a mounting pin is arranged at a central portion of an inner side surface of the protective cover, an external thread is provided on the mounting pin, and the protective cover is arranged on the outer sidewall in such a manner that the mounting pin is screwed to the inside of the mounting through hole.

An aircraft comprises a main body and an aircraft impeller described above;
wherein the main body comprises a driving device which is engaged with the mounting through hole so that the main body is connected to the aircraft impeller.

Optionally, the driving device comprises a driver arranged on the main body and a transmission shaft connected to the driver via a coupling, and the transmission shaft is mounted inside the mounting through hole; and the driver is a motor or an engine.

Optionally, a damping spring is sleeved on the transmission shaft.

The present application has the following advantageous effects: the aircraft impeller according to the present application can provide a lift force for an aircraft without occurrence of overflow of wind power. After the aircraft impeller is mounted to the aircraft, when the aircraft is moving at constant velocity in the air, energy is consumed only by the friction between the surface of the aircraft impeller and the air, and for overcoming air resistance. The energy consumption is directly proportional to the processing technology.

BRIEF DESCRIPTION OF DRAWINGS

In order to more clearly illustrate technical solutions of embodiments of the present application, drawings required for use in the embodiments will be described briefly below. It should be understood that the drawings below are merely illustrative of some embodiments of the present application, and therefore should not be considered as limiting its scope. It will be understood by those of ordinary skill in the art that other relevant drawings can also be obtained from these drawings without any inventive effort.

Figure 1:
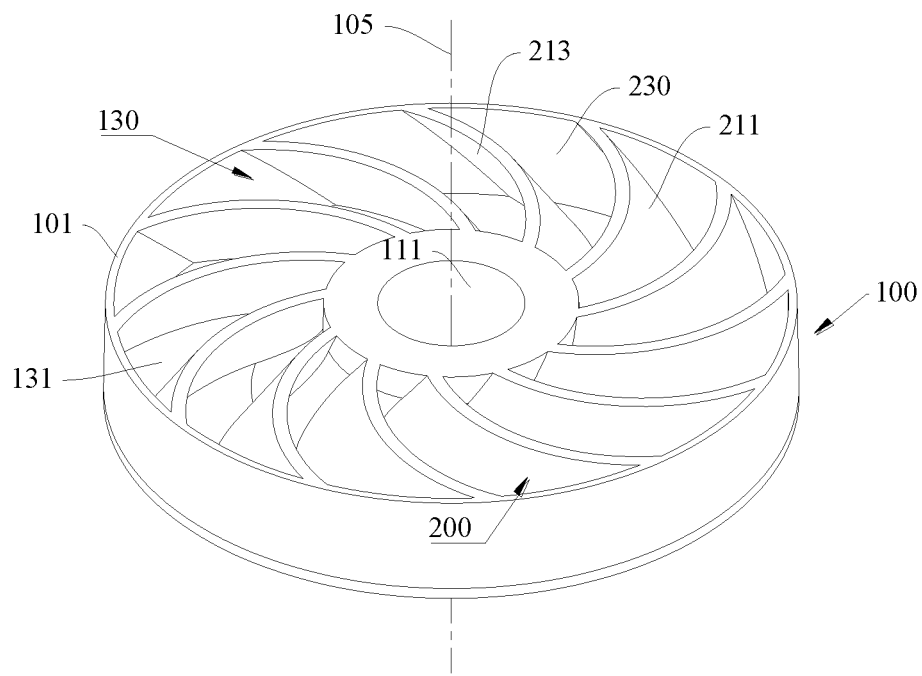
FIG. 1 is a schematic structural view of an aircraft impeller according to an embodiment of the present application when viewed from a first angle.

Reference Numerals: 001—aircraft impeller; 002—impeller base; 100—frame body; 200—rotary wheel part; 101—first surface; 103—second surface; 110—protrusion; 130—mounting groove; 141—outer sidewall; 105—axial centre line; 131—bottom surface; 111—mounting through hole; 140—mounting area; 210—blade; 211—windward surface; 213—leeward surface; 230—air groove; 300—protective cover; 301—mounting pin; 400—motor; 401—transmission shaft; 402—damping spring.

DETAILED DESCRIPTION OF EMBODIMENTS

In order to further clarify the objects, technical solutions, and advantages of the embodiments of the present application, the technical solutions of the embodiments of the present application will be described below clearly and completely with reference to the drawings of the embodiments of the present application. It is apparent that the embodiments to be described are some, but not all of the embodiments of the present application. All the other embodiments obtained by those of ordinary skill in the art in light of the embodiments of the present application without inventive efforts will fall within the scope of the present application as claimed. Thus, the following detailed description of the embodiments of the present application, as represented in the drawings, is not intended to limit the scope of the present application as claimed, but is merely representative of selected embodiments of the present application. All the other embodiments obtained by those of ordinary skill in the art in light of the embodiments of the present application without inventive efforts will fall within the scope of the present application as claimed In the description of the present application, it should be understood that terms indicating orientation or positional relationships indicate the orientation or positional relationships shown based on the drawings, and are intended only to facilitate the description of the present application and simplify the description, but not intended to indicate or imply that the referred devices or elements must be in a particular orientation, or constructed or operated in the particular orientation, and therefore should not be construed as limiting the present application.

In the present application, the terms such as "mount", "couple", "connect", and "fix" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements or mutual interaction between two elements. The specific meanings of the above-mentioned terms in the present application can be understood by those of ordinary skill in the art according to specific situations.

In the present application, unless otherwise expressly specified or defined, a first feature on (or above) or below a second feature may include a case where the first and second features are in direct contact, and may also include a case where the first and second features are not in direct contact, but are in contact via an additional feature therebetween. Moreover, a first feature on, above, or over a second feature is meant to include a case where the first feature is directly above or obliquely above the second feature, or merely means that the first feature is at a level height higher than the second feature. A first feature under, below, or underneath a second feature is meant to include a case where the first feature is directly below or obliquely below the second feature, or merely means that the first feature is at a level height lower than the second feature.

This embodiment provides an aircraft impeller, which comprises a frame body and a rotary wheel part, wherein the frame body comprises a mounting groove in which the rotary wheel part is fixedly arranged; the mounting groove has an axial centre line; and the mounting groove further has an open surface and a bottom surface arranged opposite to each other; the rotary wheel part comprises at least one blade distributed around the axial centre line, the blade comprising a windward surface; and an angle, formed between the open surface and a plane tangential to the windward surface at a position where the windward surface is connected to the open surface, is an acute angle. Optionally, a mounting through hole is provided in the middle of the mounting groove, the mounting through hole has a central axis substantially coincident with the axial centre line, and the mounting through hole has a sidewall extending from the open surface to the bottom surface.

Optionally, the blade has a cycloidal curvature that curves in a rotation direction away from the axial centre line.

Optionally, the mounting groove is a cylindrical groove, and an end of the blade remote from the axial centre line is fixedly connected to an inner wall of the mounting groove.

Optionally, the mounting through hole is a cylindrical through hole.

Optionally, twelve blades are provided, and the twelve blades are mounted at an equal interval around the axial centre line in a circumferential direction.

Optionally, an end of the blade remote from the bottom surface is located on the open surface.

Optionally, an end of the blade close to the bottom surface is fixedly connected to the bottom surface.

Optionally, a protrusion extending away from the open surface is arranged on a side of the frame body remote from the open surface, the protrusion is a cylindrical bump, and the protrusion has an axial center substantially coincident with the axial centre line.

Optionally, a distance from an end of the protrusion remote from the second surface to the second surface is smaller than a distance from the first surface to the second surface.

Optionally, the angle, formed between the open surface and the plane tangential to the windward surface at a position where the windward surface is connected to the open surface, gradually decreases in a direction extending from the axial centre line to an edge of the mounting groove.

Optionally, the blade further has a leeward surface opposite to the windward surface, and the leeward surface and the windward surface have the same radians at their respective corresponding points.

Optionally, the frame body is disc-shaped, and specifically, the frame body is in the shape of a disc.

Optionally, the aircraft impeller further comprises a protective cover capable of covering the first surface, and the protective cover is detachably arranged on an outer sidewall formed by connecting an outer edge of the first surface and an outer edge of the second surface to each other.

Optionally, an internal thread is provided inside the mounting through hole, a mounting pin is arranged at a central portion of an inner side surface of the protective cover, an external thread is provided on the mounting pin, and the protective cover is arranged on the outer sidewall in such a manner that the mounting pin is screwed to the inside of the mounting through hole.

The embodiment will be described in detail below:

This embodiment provides an aircraft impeller 001. Referring to FIG. 1, this aircraft impeller 001 comprises a frame body 100 and a rotary wheel part 200.

Figure 6:
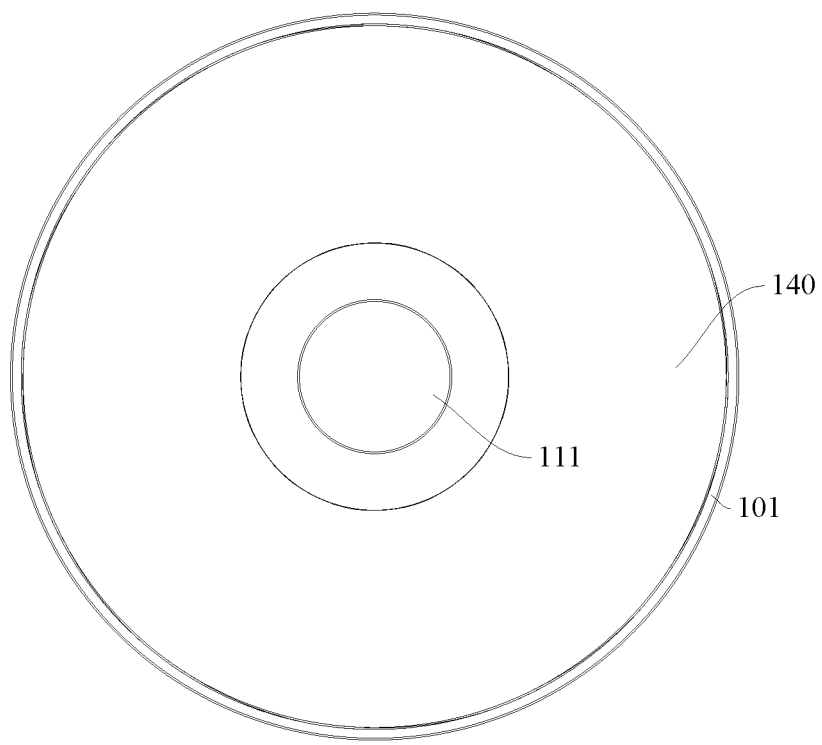
FIG. 6 is a schematic structural view of the aircraft impeller according to the embodiment of the present application when viewed from the second angle, which is not provided with a rotary wheel part.

Referring to FIG. 6, in this embodiment, the frame body 100 is disc-shaped. Specifically, the frame body 100 is in the shape of a disc. The outer periphery of the frame body 100 is polished to reduce wind resistance during rotation. The frame body 100 comprises a first surface 101 and a second surface 103 arranged opposite to each other. Optionally, a protrusion 110 is arranged on the second surface 103, and the protrusion 110 is a cylindrical bump extending from the second surface 103 in a direction away from the first surface 101. In this embodiment, a distance from an end of the protrusion 110 remote from the second surface 103 to the second surface 103 is smaller than a distance from the first surface 101 to the second surface 103, that is to say, the thickness of the protrusion 110 is smaller than the thickness of the frame body 100. The protrusion 110 has an axis substantially coincident with the axis of the frame body 100.

Figure 2:
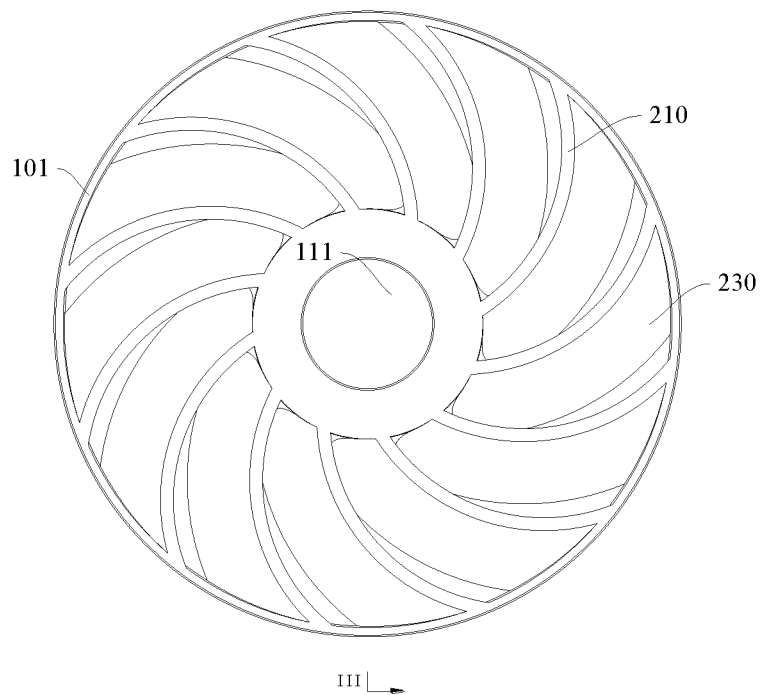
FIG. 2 is a schematic structural view of the aircraft impeller according to the embodiment of the present application when viewed from a second angle.
Figure 4:
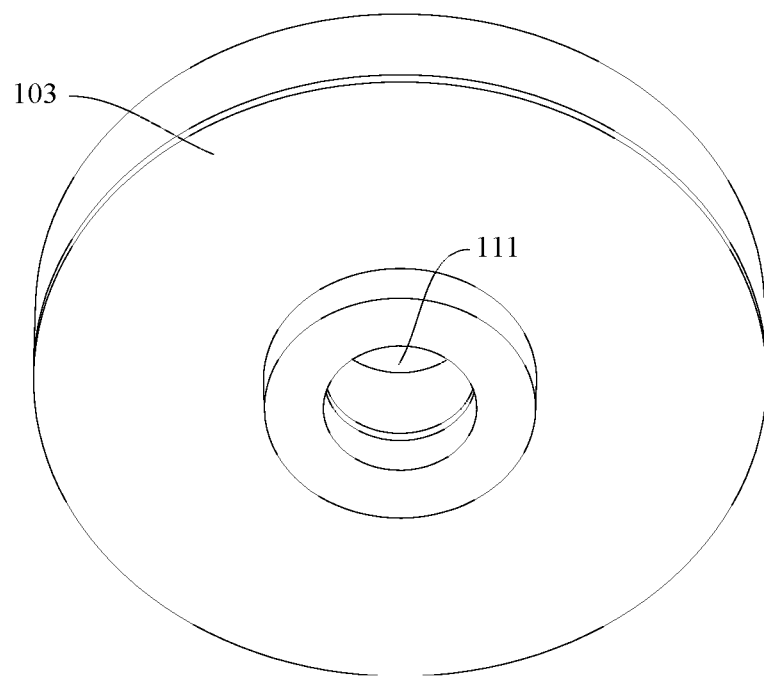
FIG. 4 is a schematic structural view of the aircraft impeller according to the embodiment of the present application when viewed from a third angle.

Referring to FIG. 2 and FIG. 4, a mounting groove 130 is provided in the first surface 101, the mounting groove 130 extends from the first surface 101 to the second surface 103, the mounting groove 130 is a cylindrical groove, and the mounting groove 130 has an axial centre line 105 substantially coincident with the axis of the frame body 100. The mounting groove 130 has an open surface and a bottom surface 131 arranged opposite to each other. The open surface is a surface where the opening of the mounting groove 130 is located, the open surface is substantially coincident with the first surface 101 of the frame body 100, and the bottom surface 131 is a surface of the mounting groove 130 that is close to the second surface 103.

Optionally, a mounting through hole 111 is provided in the mounting groove 130, the mounting through hole 111 is a cylindrical through hole, the mounting through hole 111 has an axis substantially coincident with the axial centre line 105 of the frame body 100, and the mounting through hole 111 has a sidewall extending from the open surface to the bottom surface 131, and continuedly extending to the top end of the protrusion 110 in this embodiment. The mounting through hole 111 is configured to be mounted to a driving device by which the aircraft impeller 001 is driven to rotate.

A mounting area 140 is formed between an inner wall of the mounting groove 130 and an outer wall of the mounting through hole 111, and the rotary wheel part 200 is mounted in the mounting area 140. In this embodiment, optionally, the rotary wheel part 200 comprises twelve blades 210, the twelve blades 210 are evenly distributed around a circumferential direction of the outer wall of the mounting through hole 111, and an end of the blade 210 remote from the axial centre line 105 is fixedly connected to the inner wall of the mounting groove 130. One blade 210 may substantially overlap with another blade 210 adjacent thereto by rotating about the axial centre line 105 by 30°.

The blade 210 has a windward surface 211 facing the open surface. The windward surface 211 is a surface moving toward the air when the rotary wheel part 200 is rotating.

Figure 5:
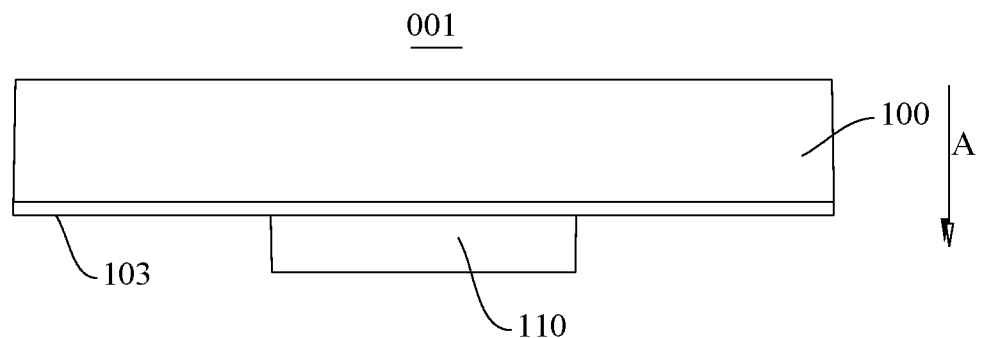
FIG. 5 is a schematic structural view of the aircraft impeller according to the embodiment of the present application when viewed from a fourth angle.

Optionally, referring to FIG. 5, the blade 210 has a cycloidal curvature that curves in a rotation direction away from the axial centre line 105, which will be specifically explained. In this embodiment, a direction parallel to the axial centre line 105 and directed from the first surface 101 to the second surface 103 is direction A, and when viewed from the direction A, the windward surface 211 is convoluted anticlockwise as it extends from the axial centre line 105 to the inner wall of the mounting groove 130. Moreover, an angle, formed between the open surface and a plane tangential to the windward surface 211 at a position where the windward surface 211 is connected to the open surface, is an acute angle.

Because the rotary wheel part 200 has an equal angular velocity at each point thereof during rotation, its linear velocity gradually increases in a direction from the axial centre line 105 toward the inner wall of the mounting groove 130, which may easily result in a turbulent movement of airflow in the mounting groove 130. To solve this problem, the angle, formed between the open surface and the plane tangential to the windward surface 211 at a position where the windward surface 211 is connected to the open surface, is gradually decreased in a direction extending from the axial centre line 105 to an edge of the mounting groove 130.

The blade 210 also has a leeward surface 213. The leeward surface 213 is a surface of the blade 210 that is opposite to the windward surface 211. In this embodiment, the leeward surface 213 and the windward surface 211 have the same radians (or curvature) at their respective corresponding points, to form a blade 210 having the same thickness at each position thereof. In this way, the strength of the blade 210 is ensured, and at the same time, a turbulent airflow caused by the thickness of the blade 210 is avoided when the rotary wheel part 200 is rotating.

Figure 3:
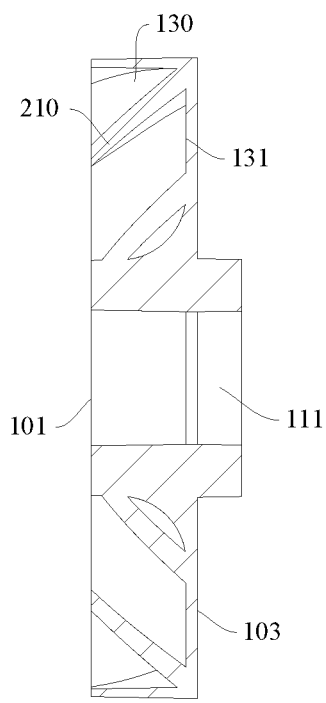
FIG. 3 is a sectional view taken along a direction III-III in FIG. 2.

Referring to FIG. 2 and FIG. 3, optionally, an end of the blade 210 remote from the bottom surface 131 is located on the open surface, that is to say, the end of the blade 210 remote from the bottom surface 131 extends from the outer wall of the mounting through hole 111 continuously to the inner wall of the mounting groove 130 and within the open surface. An end of the blade 210 close to the bottom surface 131 is located on the bottom surface 131 and fixedly connected to the bottom surface 131, that is to say, the end of the blade 210 close to the bottom surface 131 extends from the outer wall of the mounting through hole 111 continuously to the inner wall of the mounting groove 130 and within the bottom surface 131.

Figure 7:
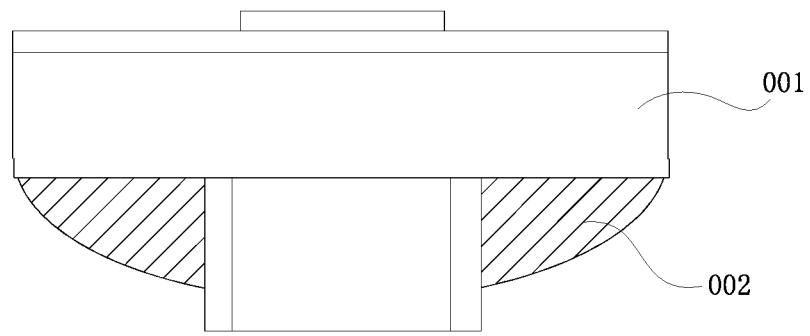
FIG. 7 is a schematic structural view showing the aircraft impeller according to the embodiment of the present application, with the impeller being mounted to an impeller base.

Referring to FIG. 7 in combination with FIG. 2 and FIG. 3, the aircraft impeller is mounted to an impeller base 002.

A six-sided sealed air groove 230 is formed by the windward surface 211 of one blade 210, the leeward surface 213 of a blade 210 adjacent thereto, the bottom surface 131 of the mounting groove 130, the inner surface of the frame body 100, and the impeller base 002. When the rotary wheel part 200 is rotating, air in the air groove 230 is driven by the blade 210 to rotate synchronously with the rotary wheel part 200, and the air is immobile relative to the interior of the aircraft impeller 001 and is maintained in a normal pressure state, while the second surface 103 moves at high speed relative to the outside air to form a negative pressure. In this state, air on a lower surface of the impeller base 002 is stationary relative to the impeller base and is in a normal pressure state, and air on an upper surface of the impeller base moves synchronously with the impeller to form a negative pressure. The magnitude of the negative pressure value is determined by the linear velocity of the aircraft impeller 001 in rotation. This negative pressure can provide a lift force for the aircraft impeller 001.

It should be noted that, in this embodiment, the rotary wheel part 200 comprises twelve blades 210. In other embodiments, the number of the blades 210 may be appropriately adjusted according to the actual size of the rotary wheel part 200 or the magnitude of the lift force required to be provided by the aircraft impeller 001.

Figure 8:
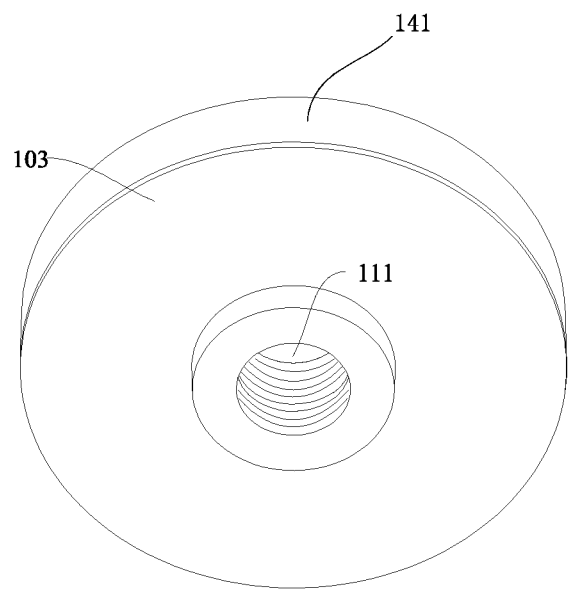
FIG. 8 is a schematic structural view of the aircraft impeller according to the embodiment of the present application when viewed from the third angle, with a mounting through hole being provided therein with an internal thread.
Figure 9:
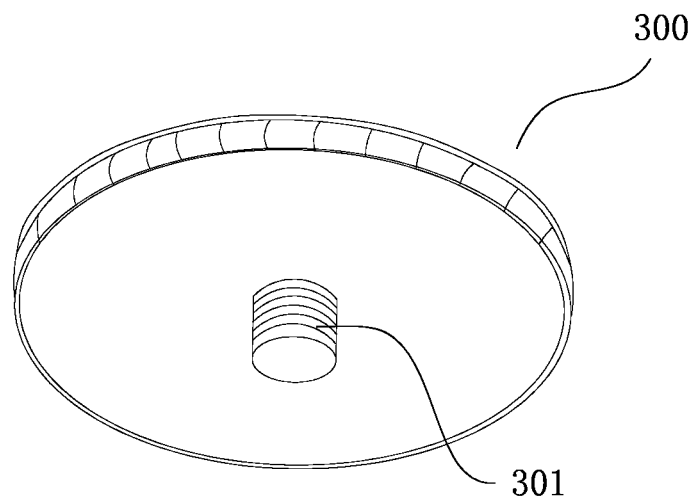
FIG. 9 is a schematic structural view showing a protective cover of the aircraft impeller according to the embodiment of the present application.

Optionally, as shown in FIG. 8 and FIG. 9 in combination with FIGS. 1 to 6, the aircraft impeller 001 further comprises a protective cover 300 capable of covering the first surface 101, and the protective cover 300 is detachably arranged on outer sidewall 141 formed by connecting an outer edge of the first surface 101 and an outer edge of the second surface 103 to each other.

Optionally, an internal thread is provided inside the mounting through hole 111, a mounting pin 301 is arranged at a central portion of the inner side surface of the protective cover 300, an external thread is provided on the mounting pin 301, and the protective cover 300 is arranged on the outer sidewall 141 in such a manner that the mounting pin is screwed to the inside of the mounting through hole 111.

Thus, when the aircraft is in use, the main function of the protective cover 300 is to protect the impeller and the aircraft in the event of an unavoidable collision with other uncertain, fixed or moving objects and facilities in the air during operation of the aircraft, to ensure safety, and to maximally avoid loss.

The aircraft impeller 001 according to the present application can provide a lift force for an aircraft without occurrence of overflow of wind power. After the aircraft impeller 001 is mounted to the aircraft, when the aircraft is hovering in the air, energy is consumed only by the friction between the surface of the aircraft impeller 001 and the air, which substantially does not require much energy consumption.

In addition, this embodiment also provides an aircraft. Referring to FIG. 1, this aircraft comprises a main body and an aircraft impeller 001.

The aircraft impeller 001 comprises a frame body 100 and a rotary wheel part 200.

Referring to FIG. 6, in this embodiment, the frame body 100 is disc-shaped. Specifically, the frame body 100 is in the shape of a disc. The outer periphery of the frame body 100 is polished to reduce wind resistance during rotation. The frame body 100 comprises a first surface 101 and a second surface 103 arranged opposite to each other. Optionally, a protrusion 110 is arranged on the second surface 103, and the protrusion 110 is a cylindrical bump extending from the second surface 103 in a direction away from the first surface 101. In this embodiment, a distance from an end of the protrusion 110 remote from the second surface 103 to the second surface 103 is smaller than a distance from the first surface 101 to the second surface 103, that is to say, the thickness of the protrusion 110 is smaller than the thickness of the frame body 100. The protrusion 110 has an axis substantially coincident with the axis of the frame body 100.

Referring to FIG. 2 and FIG. 4, a mounting groove 130 is provided in the first surface 101, the mounting groove 130 extends from the first surface 101 to the second surface 103, the mounting groove 130 is a cylindrical groove, and the mounting groove 130 has an axial centre line 105 coincident with the axis of the frame body 100. The mounting groove 130 has an open surface and a bottom surface 131 arranged opposite to each other. The open surface is a surface where the opening of the mounting groove 130 is located, the open surface is coincident with the first surface 101 of the frame body 100, and the bottom surface 131 is a surface of the mounting groove 130 that is close to the second surface 103.

Optionally, a mounting through hole 111 is provided in the mounting groove 130, the mounting through hole 111 is a cylindrical through hole, the mounting through hole 111 has an axis substantially coincident with the axial centre line 105 of the frame body 100, and the mounting through hole 111 has a sidewall extending from the open surface to the bottom surface 131, and continuedly extending to the top end of the protrusion 110 in this embodiment.

The mounting through hole 111 is configured to be connected to the main body. The main body comprises a driving device, the driving device is matchingly connected with the mounting through hole 111, and the driving device drives a rotation of the aircraft impeller 001.

Figure 10:
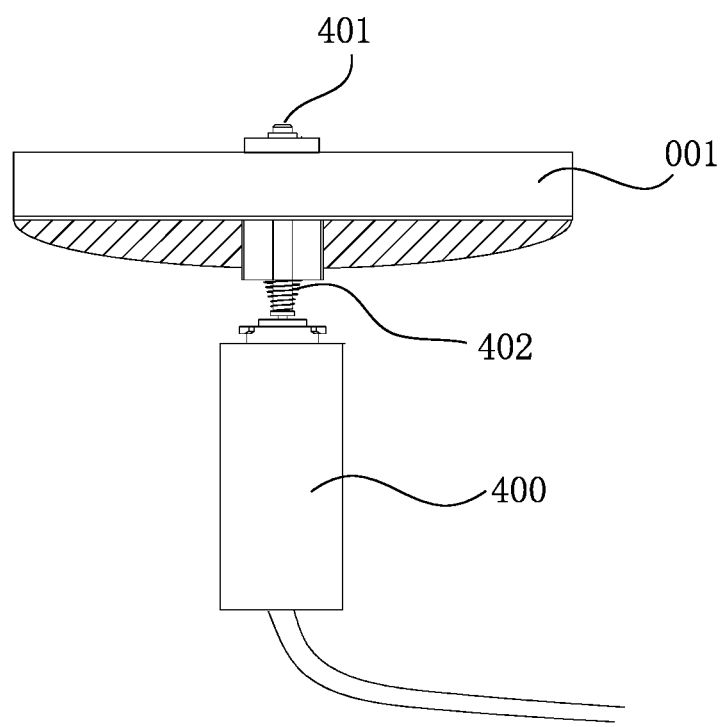
FIG. 10 is a schematic view showing a mounting structure between an aircraft impeller and a driving device of an aircraft according to an embodiment of the present application.

Optionally, referring to FIG. 10, the driving device comprises a driver arranged on the main body and a transmission shaft 401 connected to the driver via a coupling, wherein the transmission shaft 401 is mounted inside the mounting through hole 111; and the driver may be a motor 400 or engine as shown in FIG. 10.

Optionally, referring to FIG. 10, a damping spring 402 is sleeved on the transmission shaft 401, so that damping protection can be provided between the motor and the aircraft impeller 001 by the damping spring 402, which contributes to prolonging the service life of the aircraft impeller 001.

A mounting area 140 is formed between an inner wall of the mounting groove 130 and an outer wall of the mounting through hole 111, and the rotary wheel part 200 is mounted in the mounting area 140. In this embodiment, optionally, the rotary wheel part 200 comprises twelve blades 210, the twelve blades 210 are evenly distributed around a circumferential direction of the outer wall of the mounting through hole 111, and an end of the blade 210 remote from the axial centre line 105 is fixedly connected to the inner wall of the mounting groove 130. One blade 210 may substantially overlap with another blade 210 adjacent thereto by rotating about the axial centre line 105 by 30°.

The blade 210 has a windward surface 211 facing the open surface. The windward surface 211 is a surface moving toward the air when the rotary wheel part 200 is rotating.

Optionally, referring to FIG. 5, the blade 210 has a cycloidal curvature that curves in a rotation direction away from the axial centre line 105, which will be specifically explained. In this embodiment, a direction parallel to the axial centre line 105 and directed from the first surface 101 to the second surface 103 is direction A, and when viewed from the direction A, the windward surface 211 is convoluted anticlockwise as it extends from the axial centre line 105 to the inner wall of the mounting groove 130. Moreover, an angle, formed between the open surface and a plane tangential to the windward surface 211 at a position where the windward surface 211 is connected to the open surface, is an acute angle.

Because the rotary wheel part 200 has an equal angular velocity at each point thereof during rotation, its linear velocity gradually increases in a direction from the axial centre line 105 toward the inner wall of the mounting groove 130, which may easily result in a turbulent movement of airflow in the mounting groove 130. To solve this problem, the angle, formed between the open surface and the plane tangential to the windward surface 211 at a position where the windward surface 211 is connected to the open surface, is gradually decreased in a direction extending from the axial centre line 105 to an edge of the mounting groove 130.

The blade 210 also has a leeward surface 213. The leeward surface 213 is a surface of the blade 210 that is opposite to the windward surface 211. In this embodiment, the leeward surface 213 and the windward surface 211 have the same radians at their respective corresponding points, to form a blade 210 having the same thickness at each position thereof. In this way, the strength of the blade 210 is ensured, and at the same time, a turbulent airflow caused by the thickness of the blade 210 is avoided when the rotary wheel part 200 is rotating.

Referring to FIG. 2 and FIG. 3, optionally, an end of the blade 210 remote from the bottom surface 131 is located on the open surface, that is to say, the end of the blade 210 remote from the bottom surface 131 extends from the outer wall of the mounting through hole 111 continuously to the inner wall of the mounting groove 130 and within the open surface. An end of the blade 210 close to the bottom surface 131 is located on the bottom surface 131 and fixedly connected to the bottom surface 131, that is to say, the end of the blade 210 close to the bottom surface 131 extends from the outer wall of the mounting through hole 111 continuously to the inner wall of the mounting groove 130 and within the bottom surface 131.

A five-sided sealed air groove 230 is formed between the windward surface 211 of one blade 210 and the leeward surface 213 of a blade 210 adjacent thereto. When the rotary wheel part 200 is rotating, air in the air groove 230 is driven by the blade 210 to rotate synchronously with the rotary wheel part 200, and the air is immobile relative to the interior of the aircraft impeller 001 and is maintained in a normal pressure state, while the second surface 103 moves at high speed relative to the outside air to form a negative pressure. This negative pressure can provide a lift force for the aircraft impeller 001.

It should be noted that, in this embodiment, the rotary wheel part 200 comprises twelve blades 210. In other embodiments, the number of the blades 210 may be appropriately adjusted according to the actual size of the rotary wheel part 200 or the magnitude of the lift force required to be provided by the aircraft impeller 001.

In practical applications, the most ideal shape of this aircraft is a streamlined disc shape. An aircraft having any other outer shape or an aerial castle or hovering pavilion or the like is also possible, as long as it is provided with a sufficient number of the aircraft impellers 001 or a large enough aircraft impeller 001 to provide a sufficient lifting force.

The aircraft impeller 001 according to the present application can provide a lift force for the aircraft without occurrence of overflow of wind power. Therefore, when the aircraft is stationary in the air, it is substantially unnecessary to consume much energy, and it is only necessary to maintain kinetic energy for the air in the air groove 230.

The above description is merely illustrative of preferred embodiments of the present application and is not intended to limit the present application. It will be understood by those skilled in the art that various modifications and variations can be made to the present application. Any modifications, equivalent alternatives, improvements and so on made within the spirit and principle of the present application are to be included in the scope of protection of the present application.

INDUSTRIAL APPLICABILITY

The aircraft impeller according to the embodiment of the present application can provide a lift force for an aircraft without occurrence of overflow of wind power. Therefore, when the aircraft is stationary in the air, it is substantially unnecessary to consume much energy, and it is only necessary to maintain kinetic energy for the air in the air groove. The aircraft impeller can be used in the manufacture of convenient and small single-person aircrafts as substitutes for most vehicles. The aircraft impeller can also be used in the design of a super-large aerial aircraft carrier or the like for use in the atmosphere and requiring a lifting force of several hundred tons or even ten thousand tons, and therefore has strong industrial applicability.

What is claimed is:

1. An aircraft impeller, comprising a frame body and a rotary wheel part, wherein:
   the frame body comprises a mounting groove, and the rotary wheel part is fixedly arranged in the mounting groove;
   the mounting groove has an axial centre line;
   the mounting groove further has an open surface and a bottom surface arranged opposite to each other;
   the rotary wheel part comprises at least one blade distributed around the axial centre line, wherein each blade comprises a windward surface; and an angle formed between the open surface and a plane tangential to the windward surface is an acute angle, at a position where the windward surface is connected to the open surface;
   a mounting through hole is provided in a middle of the mounting groove, the mounting through hole has a central axis substantially coincident with the axial centre line, and the mounting through hole has a sidewall extending from the open surface to the bottom surface;
   the aircraft impeller further comprises a protective cover capable of covering the bottom surface, and the protective cover is detachably arranged on an outer sidewall formed by connecting an outer edge of the bottom surface and an outer edge of the open surface to each other; and
   an internal thread is provided inside the mounting through hole, a mounting pin is arranged at a central portion of an inner side surface of the protective cover, an external thread is provided on the mounting pin, and the protective cover is arranged on the outer sidewall in such a manner that the mounting pin is screwed to inside of the mounting through hole.

2. The aircraft impeller according to claim 1, wherein the at least one blade has a cycloidal curvature that curves in a rotation direction away from the axial centre line.

3. The aircraft impeller according to claim 2, wherein the mounting groove is a cylindrical groove, and an end of the at least one blade remote from the axial centre line is fixedly connected to an inner wall of the mounting groove.

4. The aircraft impeller according to claim 1, wherein the mounting groove is a cylindrical groove, and an end of the at least one blade remote from the axial centre line is fixedly connected to an inner wall of the mounting groove.

5. The aircraft impeller according to claim 1, wherein the mounting through hole is a cylindrical through hole.

6. The aircraft impeller according to claim 1, wherein twelve blades are provided, and the twelve blades are mounted at an equal interval around the axial centre line in a circumferential direction.

7. The aircraft impeller according to claim 1, wherein an end of the at least one blade remote from the bottom surface is located on the open surface.

8. The aircraft impeller according to claim 1, wherein an end of the at least one blade close to the bottom surface is fixedly connected to the bottom surface.

9. The aircraft impeller according to claim 1, wherein a protrusion extending away from the open surface is arranged on a side of the frame body remote from the open surface, the protrusion is a cylindrical bump, and the protrusion has an axial center substantially coincident with the axial centre line.

10. The aircraft impeller according to claim 9, wherein a distance from an end of the protrusion remote from the bottom surface to the bottom surface is smaller than a distance from the bottom surface to the open surface.

11. The aircraft impeller according to claim 1, wherein at a position where the windward surface is connected to the open surface, the angle formed between the open surface and a plane tangential to the windward surface gradually decreases in a direction extending from the axial centre line to an edge of the mounting groove.

12. The aircraft impeller according to claim 1, wherein the at least one blade further has a leeward surface opposite to the windward surface, and the leeward surface and the windward surface have the same radians at their respective corresponding points.

13. The aircraft impeller according to claim 1, wherein the frame body is in a shape of a disc.

14. An aircraft, comprising a main body and the aircraft impeller according to claim 1; wherein the main body comprises a driving device which is engaged with the mounting through hole so that the main body is connected to the aircraft impeller.

15. The aircraft according to claim 14, wherein the driving device comprises a driver arranged on the main body and a transmission shaft connected to the driver via a coupling, and the transmission shaft is mounted inside the mounting through hole; and the driver is a motor or an engine.

16. The aircraft according to claim 15, wherein a damping spring is sleeved on the transmission shaft.

* * * * *